United States Patent
Chester et al.

(10) Patent No.: US 8,064,552 B2
(45) Date of Patent: Nov. 22, 2011

(54) ADAPTIVE CORRELATION

(75) Inventors: David B. Chester, Palm Bay, FL (US); Alan J. Michaels, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 665 days.

(21) Appl. No.: 12/131,386

(22) Filed: Jun. 2, 2008

(65) Prior Publication Data
US 2009/0296860 A1    Dec. 3, 2009

(51) Int. Cl.
*H04B 1/00* (2006.01)
*H03D 1/00* (2006.01)

(52) U.S. Cl. .................. 375/343; 375/130; 375/140

(58) Field of Classification Search ............ 375/343
See application file for complete search history.

(56) References Cited

U.S. PATENT DOCUMENTS

| | | |
|---|---|---|
| 3,564,223 A | 2/1971 | Harris et al. |
| 4,646,326 A | 2/1987 | Backof, Jr. et al. |
| 4,703,507 A * | 10/1987 | Holden .................... 381/94.5 |
| 5,007,087 A | 4/1991 | Bernstein et al. |
| 5,048,086 A | 9/1991 | Bianco et al. |
| 5,077,793 A | 12/1991 | Falk et al. |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,598,476 A | 1/1997 | LaBarre et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,924,980 A * | 7/1999 | Coetzee ...................... 600/300 |
| 5,937,000 A | 8/1999 | Lee et al. |

(Continued)

FOREIGN PATENT DOCUMENTS
EP    0 849 664 A2    6/1998
(Continued)

OTHER PUBLICATIONS

Aparicio; "Communications Systems Based on Chaos" May 2007. Universidad Rey Juan Carlos.

(Continued)

*Primary Examiner* — David C. Payne
*Assistant Examiner* — Wednel Cadeau
(74) *Attorney, Agent, or Firm* — Fox Rothschild, LLP; Robert J. Sacco

(57) ABSTRACT

A method is provided for correlating samples of a received signal and samples of an internally generated/stored sample sequence ("IGSSS"). The method involves performing a first iteration of a first-resolution correlation state. The first-resolution correlation state involves: selecting a first N sets of samples from the received signal; selecting a first set of samples from the IGSSS; and concurrently comparing each of the N sets of samples with the first set of samples to determine if a correlation exists between the same. If it is determined that a correlation does not exist between one of the N sets of samples and the first set of samples, then a second iteration of the first-resolution correlation state is performed. If it is determined that a correlation exists between one of the N sets of samples and the first set of samples, then a first iteration of a second-resolution correlation state is performed.

17 Claims, 8 Drawing Sheets

U.S. PATENT DOCUMENTS

| | | | | |
|---|---|---|---|---|
| 6,014,446 | A | 1/2000 | Finkelstein | |
| 6,023,612 | A | 2/2000 | Harris et al. | |
| 6,038,317 | A | 3/2000 | Magliveras et al. | |
| 6,078,611 | A | 6/2000 | La Rosa et al. | |
| 6,141,786 | A | 10/2000 | Cox et al. | |
| 6,304,216 | B1 * | 10/2001 | Gronemeyer | 342/378 |
| 6,304,556 | B1 | 10/2001 | Haas | |
| 6,314,187 | B1 | 11/2001 | Menkhoff et al. | |
| 6,331,974 | B1 | 12/2001 | Yang et al. | |
| 6,377,782 | B1 | 4/2002 | Bishop et al. | |
| 6,570,909 | B1 * | 5/2003 | Kansakoski et al. | 375/148 |
| 6,614,914 | B1 | 9/2003 | Rhoads et al. | |
| 6,665,692 | B1 | 12/2003 | Nieminen | |
| 6,744,893 | B1 | 6/2004 | Fleming-Dahl | |
| 6,754,251 | B1 | 6/2004 | Sriram et al. | |
| 6,766,345 | B2 | 7/2004 | Stein et al. | |
| 6,842,479 | B2 | 1/2005 | Bottomley | |
| 6,980,656 | B1 | 12/2005 | Hinton, Sr. et al. | |
| 6,986,054 | B2 | 1/2006 | Kaminaga et al. | |
| 6,993,016 | B1 | 1/2006 | Liva et al. | |
| 7,023,323 | B1 | 4/2006 | Nysen | |
| 7,027,598 | B1 | 4/2006 | Stojancic et al. | |
| 7,069,492 | B2 | 6/2006 | Piret | |
| 7,076,065 | B2 | 7/2006 | Sherman et al. | |
| 7,078,981 | B2 | 7/2006 | Farag | |
| 7,079,651 | B2 | 7/2006 | Den Boer et al. | |
| 7,095,778 | B2 * | 8/2006 | Okubo et al. | 375/130 |
| 7,133,522 | B2 | 11/2006 | Lambert | |
| 7,170,997 | B2 | 1/2007 | Petersen et al. | |
| 7,190,681 | B1 | 3/2007 | Wu | |
| 7,200,225 | B1 | 4/2007 | Schroeppel | |
| 7,233,969 | B2 * | 6/2007 | Rawlins et al. | 708/422 |
| 7,233,970 | B2 | 6/2007 | North et al. | |
| 7,245,723 | B2 | 7/2007 | Hinton, Sr. et al. | |
| 7,269,198 | B1 | 9/2007 | Elliott et al. | |
| 7,269,258 | B2 | 9/2007 | Ishihara et al. | |
| 7,272,168 | B2 * | 9/2007 | Akopian | 375/150 |
| 7,277,540 | B1 | 10/2007 | Shiba et al. | |
| 7,529,292 | B2 | 5/2009 | Bultan et al. | |
| 7,643,537 | B1 | 1/2010 | Giallorenzi et al. | |
| 7,779,060 | B2 | 8/2010 | Kocarev et al. | |
| 7,830,214 | B2 | 11/2010 | Han et al. | |
| 7,853,014 | B2 | 12/2010 | Blakley et al. | |
| 7,974,146 | B2 | 7/2011 | Barkley | |
| 2002/0099746 | A1 | 7/2002 | Tie et al. | |
| 2003/0044004 | A1 | 3/2003 | Blakley et al. | |
| 2004/0001556 | A1 | 1/2004 | Harrison et al. | |
| 2004/0059767 | A1 | 3/2004 | Liardet | |
| 2004/0196212 | A1 | 10/2004 | Shimizu | |
| 2005/0031120 | A1 | 2/2005 | Samid | |
| 2005/0050121 | A1 | 3/2005 | Klein et al. | |
| 2005/0089169 | A1 | 4/2005 | Kim et al. | |
| 2005/0207574 | A1 | 9/2005 | Pitz et al. | |
| 2005/0274807 | A1 | 12/2005 | Barrus et al. | |
| 2006/0072754 | A1 | 4/2006 | Hinton et al. | |
| 2006/0093136 | A1 | 5/2006 | Zhang et al. | |
| 2006/0123325 | A1 | 6/2006 | Wilson et al. | |
| 2006/0209932 | A1 | 9/2006 | Khandekar et al. | |
| 2006/0251250 | A1 | 11/2006 | Ruggiero et al. | |
| 2007/0121945 | A1 | 5/2007 | Han et al. | |
| 2007/0230701 | A1 | 10/2007 | Park et al. | |
| 2008/0008320 | A1 | 1/2008 | Hinton et al. | |
| 2008/0016431 | A1 | 1/2008 | Lablans | |
| 2008/0095215 | A1 | 4/2008 | McDermott et al. | |
| 2008/0198832 | A1 | 8/2008 | Chester | |
| 2008/0263119 | A1 | 10/2008 | Chester et al. | |
| 2008/0294710 | A1 | 11/2008 | Michaels | |
| 2008/0294956 | A1 | 11/2008 | Chester et al. | |
| 2008/0304553 | A1 | 12/2008 | Zhao et al. | |
| 2008/0304666 | A1 | 12/2008 | Chester et al. | |
| 2008/0307022 | A1 | 12/2008 | Michaels et al. | |
| 2008/0307024 | A1 | 12/2008 | Michaels et al. | |
| 2009/0034727 | A1 | 2/2009 | Chester et al. | |
| 2009/0044080 | A1 | 2/2009 | Michaels et al. | |
| 2009/0110197 | A1 | 4/2009 | Michaels | |
| 2009/0122926 | A1 | 5/2009 | Azenkot et al. | |
| 2009/0196420 | A1 | 8/2009 | Chester et al. | |
| 2009/0202067 | A1 | 8/2009 | Michaels et al. | |
| 2009/0245327 | A1 | 10/2009 | Michaels | |
| 2009/0279688 | A1 | 11/2009 | Michaels et al. | |
| 2009/0279690 | A1 | 11/2009 | Michaels et al. | |
| 2009/0296860 | A1 | 12/2009 | Chester et al. | |
| 2009/0300088 | A1 | 12/2009 | Michaels et al. | |
| 2009/0309984 | A1 * | 12/2009 | Bourgain et al. | 348/208.4 |
| 2009/0310650 | A1 | 12/2009 | Chester et al. | |
| 2009/0316679 | A1 | 12/2009 | Van Der Wateren | |
| 2009/0323766 | A1 | 12/2009 | Wang et al. | |
| 2009/0327387 | A1 | 12/2009 | Michaels et al. | |
| 2010/0111296 | A1 | 5/2010 | Brown et al. | |
| 2010/0254430 | A1 | 10/2010 | Lee et al. | |
| 2010/0309957 | A1 | 12/2010 | Chester et al. | |
| 2010/0316090 | A1 | 12/2010 | Chester et al. | |

FOREIGN PATENT DOCUMENTS

| | | |
|---|---|---|
| EP | 0 949 563 | 10/1999 |
| EP | 2 000 900 A2 | 12/2008 |
| EP | 2 000 902 A2 | 12/2008 |
| GB | 1167272 A | 10/1969 |
| JP | 2004279784 A | 10/2004 |
| WO | WO-0135572 A2 | 5/2001 |
| WO | WO-2006 110954 | 10/2006 |
| WO | WO-2008065191 A1 | 6/2008 |
| WO | WO-2008099367 A2 | 8/2008 |
| WO | WO-2008130973 A1 | 10/2008 |
| WO | WO-2009146283 A1 | 12/2009 |

OTHER PUBLICATIONS

Bererber, S.M., et al., "Design of a CDMA Sysetm in FPGA Technology", Vehicular Technology Conference, 2007. VTC2007-SPRING. IEEE 65th Apr. 22, 2007, Apr. 25, 2007), pp. 3061-3065, XP002575053 Dublin ISBN: 1-4244-0266-2 Retrieved from the Internet: URL:http://ieeexplore.ieee.org> [retrieved on Mar. 23, 2010].

Boyar, "Inferring Sequences Produce by Pseudo-Random Number Generators", Journal of the Associate for Computing Machine, vol. 36, No. 1, pp. 20-41, 1989.

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. 1-1_1, XP010715117 ISBN: 978-977-5031-77-8.

Kolumban, et al., "Chaotic Communications with Correlator Receivers: Theory and Performance Limits" Proceedings of the IEEE, vol. 90, No. 5, May 2002.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Rabiner, Lawrence R., "A Tutorial on Hidden Markov Models and Selected Applications in Speech Recognition", Proceedings of the IEEE, vol. 77, No. 2, Feb. 1989.

Soobul, Y., et al. "Digital chaotic coding and modulation in CDMA" IEEE AFRICON Oct. 2, 2002, Oct. 4, 2002, pp. 841-846, XP002575052 Retrieved from the Internet: URL:http://ieeexplore.ieee.org> [retrieved on Mar. 23, 2010].

Taylor, F.J., "Residue Arithmetic A Tutorial with Examples", Computer, vol. 17, No. 5, pp. 50-62, May 1984, doi: 10.1109/MC.1984.1659138.

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.
Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.
Knuth, D.E., "The Art of Computer Programming, Third Edition; vol. 2 Seminumerical Algorithms". Feb. 2005, Addison-Wesley, Boston 310200, XP002511903, pp. 142-146, 284-292.
Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.
Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].
Manikandan, et al, "A Novel Pulse Based Ultrawide Band System Using Chaotic Spreading Sequences" Communication Systems Software and Middleware, 2007. COMSWARE 2007. 2nd International Conference ON, IEEE, PI, Jan. 1, 2007, pp. 1-5, XP031113946 ISBN: 978-1-4244-0613-5; p. 1, p. 5.
Morsche et al., "Signals and Systems," lecture notes, University of Eindhoven, The Netherlands (1999).
Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.
Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.
Pleszczynski, S, "On the Generation of Permutations" Information Processing Letters, Amsterdam, NL, vol. 3, No. 6, Jul. 1, 1975, pp. 180-183, XP008023810, ISSN: 0020-0190.
Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.
Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.
Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.
Yen, et al., (1999) "Residual Number System Assisted CDMA: A New System Concept", In: ACTS'99, Jun. 8-11, 1999, Sorrento, Italy.
Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.
Michaels, et al., U.S. Appl. No. 12/496,214, filed Jul. 1, 2009, entitled "Anti-Jam Communications Having Selectively Variable PAPR Including Cazac Waveform".
Michaels, et al., U.S. Appl. No. 12/507,111, filed Jul. 22, 2009, entitled "Anti-Jam Communications Using Adaptive Chaotic Spread Waveform".
Chester, et al., U.S. Appl. No. 12/480,264, filed Jun. 8, 2009, entitled "Continuous Time Chaos Dithering".
Chester, et al., U.S. Appl. No. 12/481,704, filed Jun. 10, 2009, entitled "Discrete Time Chaos Dithering".
Michaels, et al., U.S. Appl. No. 12/345,163, filed Dec. 29, 2008, entitled "Communications System Employing Chaotic Spreading Codes With Static Offsets".
Micheals, et al., U.S. Appl. No. 12/344,962, filed Dec. 29, 2008, entitled "Communications System Employing Orthogonal Chaotic Spreading Codes".
Michaels, et al., U.S. Appl. No. 12/396,828, filed Jun. 3, 2009, entitled "Communications System Employing Orthogonal Chaotic Spreading Codes".
Michaels, et al., U.S. Appl. No. 12/496,170, filed Jul. 1, 2009, entitled "Permission Based Multiple Access Communications Systems".
Michaels, et al., U.S. Appl. No. 12/496,233, filed Jul. 1, 2009, entitled "Permission-Based Secure Multiple Access Communication Systems Rotations".
Michaels, et al., U.S. Appl. No. 12/507,512, filed Jul. 22, 2009, entitled "Permission-Based TDMA Chaotic Communication Systems".
Micheals, et al., U.S. Appl. No. 12/496,085, filed Jul. 1, 2009, entitled, "High-Speed Cryptographic System Using Chaotic Sequences".
Michaels, et al., U.S. Appl. No. 12/496,123, filed Jul. 1, 2009, entitled, "Rake Receiver for Spread Spectrum Chaotic Communications Systems".
Michaels, et al., U.S. Appl. No. 12/496,146, filed Jul. 1, 2009, entitled "Improved Symbol Estimation for Chaotic Spread Spectrum Signal".
Micheals, et al., U.S. Appl. No. 12/480,316, filed Jun. 8, 2009, entitled "Symbol Duration Dithering for Secured Chaotic Communications".
Michaels, et al., U.S. Appl. No. 12/496,183, filed Jul. 1, 2009, entitled "Bit Error Rate Reduction in Chaotic Communications".
Michaels, Alan, U.S. Appl. No. 12/248,131, filed Oct. 9, 2008, entitled "AD-HOC Network Acquisition Using Chaotic Sequence Spread Waveform".
Michaels, Alan, U.S. Appl. No. 12/201,021, filed Aug. 29, 2008, entitled, "Multi-Tier AD-HOC Network Communications".
Deckert, T., et al: "Throughput of WLAN with TDMA and Superimposed Transmission with Resource and Traffic Constraints" Personal, Indoor and Mobile Radio Communications, 2006 IEEE 17th Inter National Symposium ON, IEEE, PI, Sep. 1, 2006, pp. 1-5, XP031023581, ISBN: 978-1-4244-0329-5.
Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.
Barda, A; et al., "Chaotic signals for multiple access communications," Electrical and Electronics Engineers in Israel, 1995, Eighteenth Convention of, vol., No., pp. 2.1.3/1-2.1/3/5, Mar. 7-8, 1995.
Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.
Menezes, Vanstone, Oorschot: "Handbook of Applied Cryptography", 1997, CRC Press LLC, USA, XP002636791, p. 80-p. 85, p. 238-242.
Schneier, Bruce: "Applied Cryptography Second Edition", 1997, John Wiley & Sons, USA, XP002636792, p. 254-p. 255.

* cited by examiner

ADAPTIVE CORRELATION

BACKGROUND OF THE INVENTION

1. Statement of the Technical Field

The invention concerns correlation techniques for use in communications systems and systems for implementing the same. More particularly, the invention concerns an accurate and efficient correlation technique for communications applications, such as synchronizing communications transmitted from transmitters to a receiver, correcting signal transmission delays, and detecting certain channel impairments (such as multipath).

2. Description of the Related Art

In communications systems, correlation techniques are implemented in correlation devices of receivers. The correlation techniques are employed to obtain timing and phase information of a signal being transmitted from a transmitter and a signal being received at a receiver. This timing and phase information is used to correct for transmission time delays, carrier phase offsets occurring in a signal transmission process, and multiple channel paths occurring in a signal transmission process. More particularly, the timing information is used to correct for propagation time delays occurring in transmission paths. The phrase "transmission path" as used herein refers to a path between a transmitter and a receiver of a communications system that a data communications follows. The path can include, but is not limited to, a communications link existing between the transmitter and receiver. The phase information is used to correct carrier phase offsets in the transmission process.

There are many devices known in the art that implement a variety of correlation techniques. One such device is a pipelined correlator such as that shown in FIG. 1. The pipelined correlator is configured to correlate received signals in real time and at a plurality of time delays. In this regard, it should be understood that the pipelined correlator can be comprised of a plurality of delay devices, a plurality of multipliers, and a plurality of adders forming a summer. As shown in FIG. 1, samples of a received signal are communicated to the delay devices. The term "sample" as used herein refers to a quadrature digital value obtained from a continuous signal in a preceeding digital signal processing. The delay devices are configured to delay the samples in time by a pre-determined amount. Stored samples are communicated to the complex multipliers. The stored samples $1, \ldots, N$ can be digital values obtained from a digital signal processing of a received signal or a pseudo-random number sequence.

The multipliers are configured to statically multiply a stored sample $1, \ldots, N$ by a real-time receive signal. In this regard, it should be understood that each multiplier is configured to compute a product utilizing complex multiply arithmetic. For example, a first multiplier is configured to multiply a stored sample N by a time delayed sample $S_N$ of a received signal. A second multiplier is configured to multiply a stored sample N−1 by a time delayed sample $S_{N-1}$, and so on.

The multipliers are also configured to communicate the products of the complex multiply arithmetic to the summer. Upon receipt of the products, the summer adds the same together to obtain a correlation value. If the correlation value magnitude is less than a pre-defined threshold value, then the relative delay is deemed incorrect (i.e., the desired signal is not considered located). If the correlation value magnitude is greater than a pre-defined threshold value, then the relative delay is deemed correct (i.e., the desired signal or correlation peak has been located).

Despite the advantages of this pipelined correlation technique, it suffers from certain drawbacks. For example, this pipelined configuration is a real time process which prevents post-processing verification of the correlation index values. Once the incoming signal passes the ideal correlation peak with the stored or internally generated values, the signal can't be re-correlated. More particularly, the pipelined configuration is absent of dynamic abilities, such as an ability to change samples and an ability to double-check a suspected correlation peak. This pipelined configuration is also hardware intensive and computationally inefficient since all possible values use full length correlations. The expected number of arithmetic operations required to obtain the correlation peak increases linearly with both the uncertainty window and the correlation length. The phrase "uncertainty window" as used herein refers to the bounded temporal range that includes the minimum and maximum possible signal delay. Correlating over the entire uncertainty window is required to be certain of acquiring the signal. This pipelined configuration is further hardware intensive by requiring N dedicated or re-used multipliers. In this regard, it should be appreciated that the pipelined structure can only generate one correlation value per clock cycle. The correlation value represents the sum of all products, where the number of hardware products is the length of the correlation.

In view of the forgoing, there is a need for a method and system implementing an improved efficiency correlation technique. There is also a need in the improved correlation technique to allow for verification of the correlation index values by relaxing the size of the correlation. The improved correlation technique also needs to be less hardware intensive than conventional correlation techniques. The improved correlation technique further needs to be more computationally efficient than conventional correlation techniques.

SUMMARY OF THE INVENTION

A method is provided for correlating samples of a received signal and samples of an internally generated or stored sample sequence. The method includes the step of performing a first iteration of a low-resolution correlation. The low-resolution correlation includes the step of selecting a first N sets of received signal samples from a received signal. The low-resolution correlation also includes the step of selecting a first set of reference samples from an internally generated or stored sample sequence. The low-resolution correlation further includes the step of concurrently correlating each of the first N sets of received signal samples with the first set of reference samples to determine if a sufficient correlation exists between the same. It should be understood that the first N sets of received signal samples and the first set of reference samples comprise the same number of samples.

If it is determined in the low-resolution correlation that a sufficient correlation exists between at least one of the first N sets of received signal samples and the first set of reference samples, then a higher-resolution correlation is performed. The higher-resolution correlation comprises the steps of: (a) selecting a second N independent sets of received signal samples from a received signal; and (b) selecting a second set of independent reference samples from the internally generated or stored sample sequence. The second N sets of received signal samples and the second set of reference samples comprise the same number of samples. The second N sets of received signal samples comprise a larger number of samples than the first N sets of received signal samples. The second N sets of received signal samples comprise samples that are of an equal relative delay in time as compared to samples contained in the second set of reference samples.

The higher-resolution correlation also comprises the step of concurrently comparing each of the second N sets of received signal samples with the second set of reference samples to determine if a sufficient correlation exists between the same. If it is determined that a sufficient correlation exists between at least one of the second N sets of received signal samples and the second set of reference samples, then a correlation index value is computed.

If it is determined that a sufficient correlation does not exist between at least one of the first N sets of received signal samples and the first set of reference samples, then a next iteration of the low-resolution correlation is performed. The next iteration of the low-resolution correlation comprises the steps of: (a) selecting a second N sets of received signal samples from a received signal; and (b) a second set of reference samples from the internally generated or stored sample sequence. The second N sets of received signal samples and the second set of reference samples comprise the same number of samples. The second N sets of received signal samples comprise the same number of samples as the first N sets of received signal samples. The second N sets of received signal samples comprise samples that are delayed in time as compared to samples contained in the first N sets of received signal samples.

BRIEF DESCRIPTION OF THE DRAWINGS

Embodiments will be described with reference to the following drawing figures, in which like numbers represent like items throughout the figures, and in which.

DETAILED DESCRIPTION OF THE PREFERRED EMBODIMENTS

Figure 1:
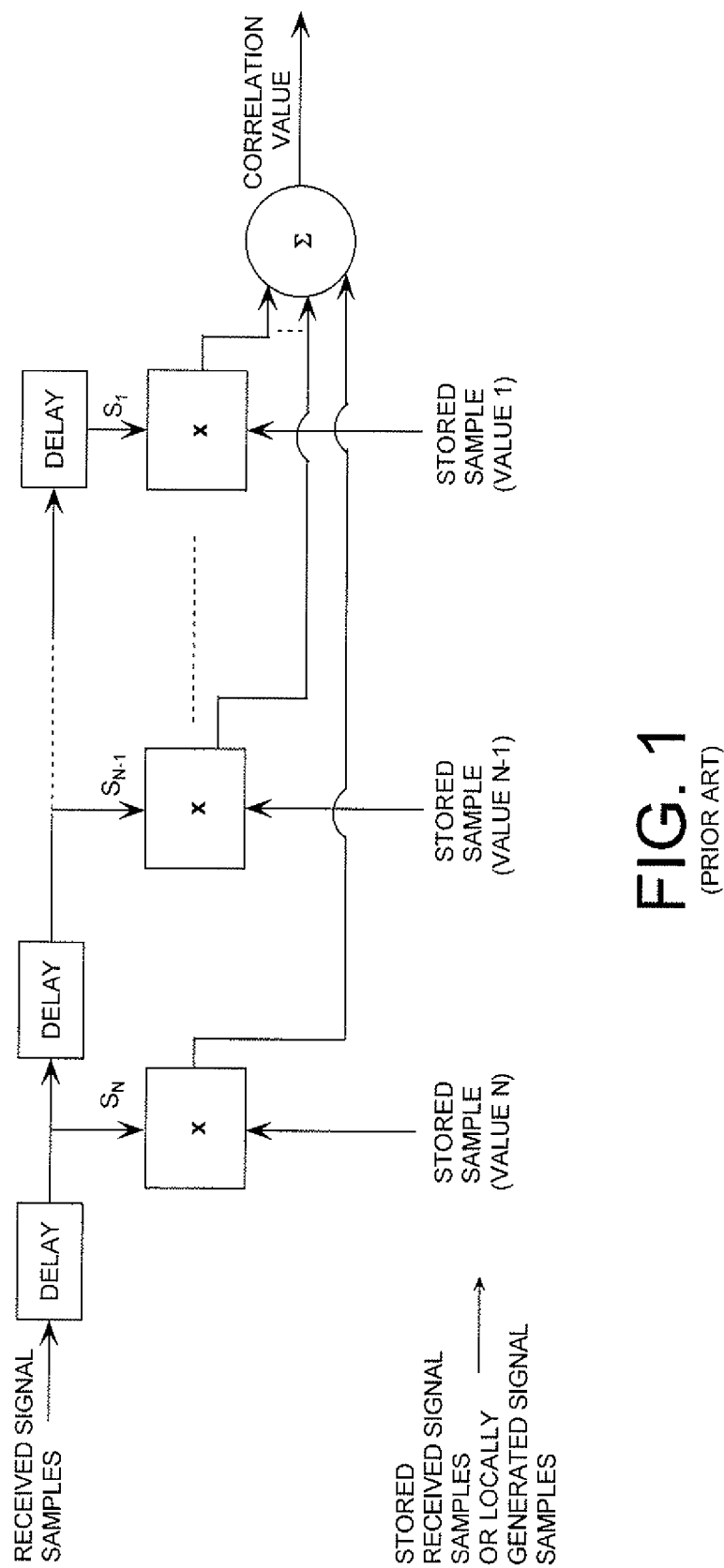
FIG. 1 is a block diagram of a conventional pipelined correlator.
Figure 2:
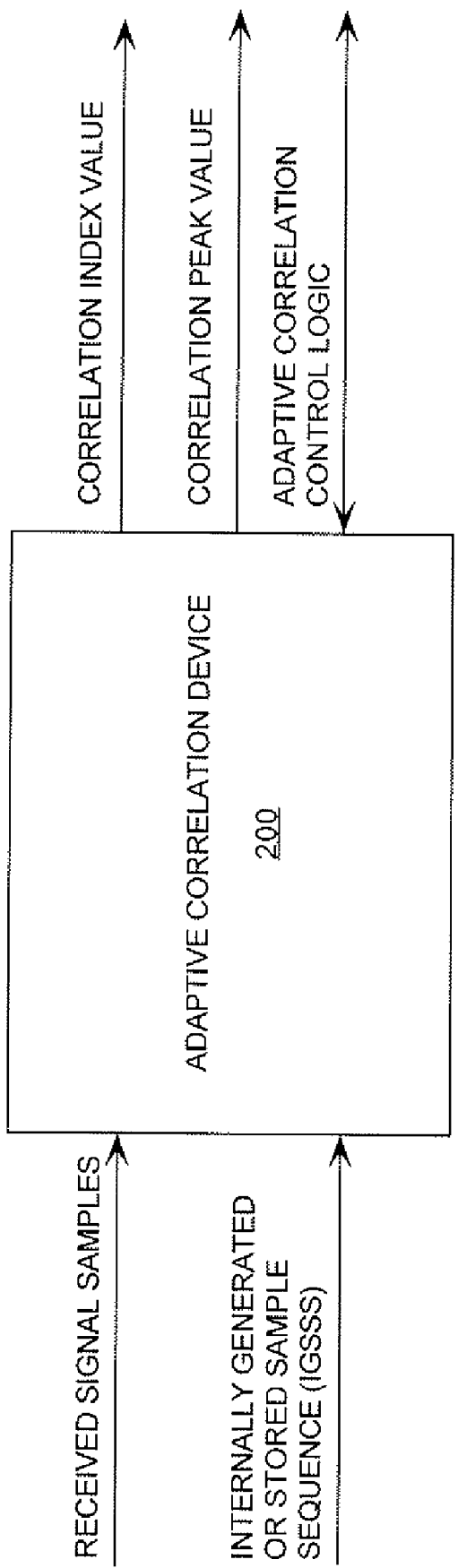
FIG. 2 is a block diagram of an adaptive correlation device that is useful for understanding the invention.

Referring now to FIG. 2, there is provided a diagram of an adaptive correlation device 200. The adaptive correlation device 200 can be implemented in a receiver configured to synchronize a received signal with an internally generated or stored sample sequence. The term "sample" as used herein refers to a digital value obtained from a continuous signal. It should be understood that the adaptive correlation device 200 performs actions to obtain time delay and phase shift information of the received signal relative to an internally generated or stored signal. This time delay and phase shift information is hereinafter referred to as a correlation value. The phrase "correlation peak value" as used herein refers to a relative time delay and phase shift providing a maximum correlation between a received signal and an internally generated or stored sample sequence. The phrase "correlation index value" as used herein refers to a relative delay, often measured in samples, between a received signal and an internally generated or stored sample sequence.

As should be understood, the correlation peak value and correlation index value can be communicated from the adaptive correlation device 200 to a sampling device (not shown). The sampling device (not shown) can be configured to utilize the correlation peak value and correlation index value to correct for transmission time delays occurring in a signal transmission process. More particularly, the correlation index value can be used to correct for propagation time delays occurring in a transmission path. A sequence of correlation peak values can also be used to correct for carrier frequency phase shifts occurring during transmission. The phrase "transmission path" as used herein refers to a path between a transmitter and a receiver of a communications system that a data communication follows. The path can include, but is not limited to, a communications link existing between the transmitter and the receiver.

Figure 3:
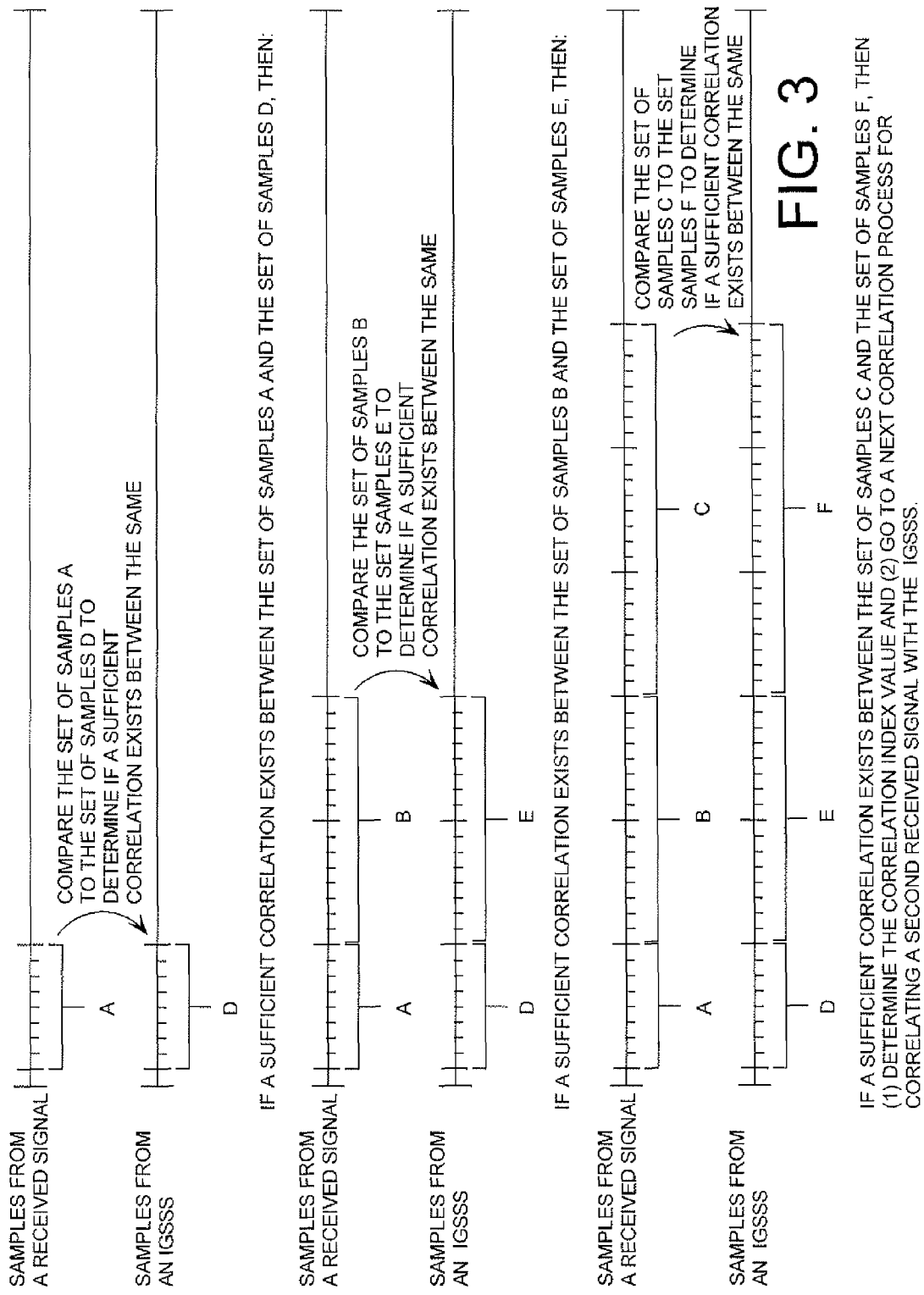
FIG. 3 is a conceptual diagram of a correlation process performed by the adaptive correlation device of FIG. 2.

Referring now to FIG. 3, there is provided a conceptual diagram of a correlation process that can be performed by the adaptive correlation device 200. Two (2) sufficiently large sequences of signal samples are depicted in FIG. 3. A first sequence of signal samples is from an externally received signal. A second sequence of signal samples is from an internally generated or stored signal. The first and second sequences of signal samples may be stored in internal memory, may be stored in internal buffers, and/or obtained in real-time. The correlation process includes a low-resolution correlation, a medium-resolution correlation, and a fine-resolution correlation. The phrase "low-resolution correlation" as used herein refers to a correlation between N1 samples of the received signal and N1 samples of the internally generated or stored sample sequence. The phrase "medium-resolution correlation" as used herein refers to a correlation between N2 samples of the received signal and N2 samples of the internally generated or stored sample sequence. The phrase "fine-resolution correlation" as used herein refers to a correlation between N3 samples of the received signal and N3 samples of the internally generated or stored sample sequence. The values of N1, N2, and N3 are all integers, with N3>N2>N1.

The low-resolution correlation involves selecting a first set of samples A from the received signal and a first set of samples D from the internally generated or stored sample sequence. It should be noted that the sets of samples A, D contain the same number of samples. The low-resolution correlation also involves comparing the first set of samples A from the received signal with the first set of samples D from the internally generated or stored sample sequence.

If a sufficient correlation exists between the sets of samples A and D, then the medium-resolution correlation is performed. In this context, "sufficient" correlation is defined by the user as a threshold value that is compared to the correlation value obtained from sample sets A and D. It should be noted that correspondingly larger threshold values are chosen for larger sized sample sets. The medium-resolution correlation involves selecting a second set of samples B from the received signal and a second set of samples E from the internally generated or stored sample sequence. It should be noted that the second sets of samples B, E contain the same number of samples. However, the sets of samples B, E contain a larger number of samples than the first sets of samples A, D. It should also be noted that the second sets of samples B, E contain samples that are independent to the first sets of samples A, D. Upon selecting the second sets of samples B, E, the medium-resolution correlation continues with a comparison of the sets of samples B, E to determine if a sufficient correlation exists between the same.

If a sufficient correlation exists between the sets of samples B, E, then the fine-resolution correlation is performed. The fine-resolution correlation involves selecting a third set of samples C from the received signal and a third set of samples F from the internally generated or stored sample sequence. It should be noted that the third set of samples C, F contain the same number of samples. However, the sets of samples C, F contain a larger number of samples than the second sets of samples B, E. It should also be noted that the third sets of samples C, F contain samples that are independent to both the first sets of samples A, D and the second sets of samples B, E. Upon selecting the third sets of samples C, F, the fine-resolution correlation continues with a comparison of the sets of samples C, F to determine if a sufficient correlation exists between the same. If a sufficient correlation exists between the sets of samples C, F, then a correlation lock is achieved and a correlation index value is computed. It should be noted that any number of intermediate correlation steps may be utilized during this adaptive correlation process. The present invention is not limited to a coarse, medium, and fine resolution correlation. A next correlation process may begin after communicating this correlation index value to the receiver.

Whenever a correlation peak value is computed between sample sets A/D, B/E, or C/F and the correlation peak value does not exceed a pre-defined threshold value, the correlation process ends with the decision that no sufficient correlation exists. The correlation process resumes after stepping sample sets A, B, and C an integer number of samples in time and repeating the process until a sufficient correlation is found. If no correlation is determined to be sufficient, then the correlation process does not achieve a "lock". In this context, a "correlation lock" refers to proper determination of the relative delay between two (2) signals with a high degree of certainty. The correlation lock can be a false positive. Reduction of false positives is one of the benefits of adaptive correlation. The phrase "high degree of certainty" as used herein means that the likelihood of a lock being declared when the received signal timing is not approximate to that of the reference or when the received signal is not present is low and the likelihood of a correlation peak not being detected when the received signal timing is approximately equal to the reference signal is likewise low.

A person skilled in the art can appreciate that the correlation process described above in relation to FIG. 3 can still require a substantial amount of processing if serially performed for N sets of samples at different time delays. However, a parallel processing architecture can be utilized to improve the processing time. A conceptual diagram of a correlation process implementing a parallel processing architecture is provided in FIG. 4. In the example shown, N is equal to eight (8). However, the invention is not limited in this regard.

Figure 4:
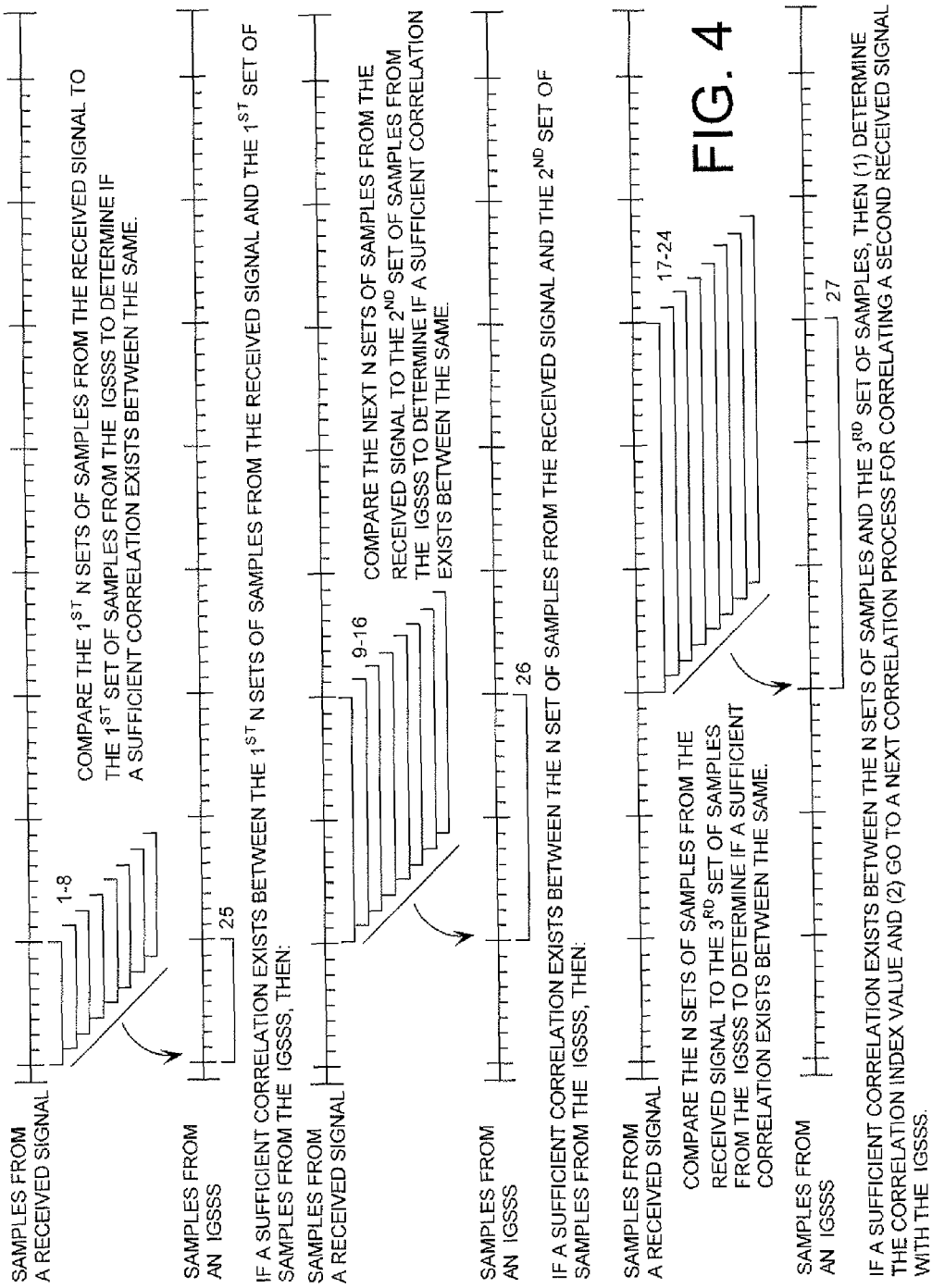
FIG. 4 is a conceptual diagram of a correlation process employing parallel processing that is performed by the adaptive correlation device of FIG. 2.

Referring now to FIG. 4, the correlation process includes a low-resolution correlation, a medium-resolution correlation, and fine-resolution correlation. The low-resolution correlation involves selecting N sets of samples from the received signal and a first set of samples from the internally generated or stored sample sequence. It should be noted that the sets of samples 1, . . . , 8, 25 contain the same number of samples. The low-resolution correlation also involves concurrently comparing each of the sets of samples 1, . . . , 8 from the received signal with the first set of samples 25 from the internally generated or stored sample sequence to determine if a correlation exists between the same. The low-resolution correlation can be provided using a total of N=8 complex multipliers.

If a sufficient correlation exists between at least one of the sets of samples 1, . . . , 8 and the set of samples 25, then the medium-resolution correlation is performed. The medium-resolution correlation involves selecting the next N sets of samples from the received signal and a second set of samples from the internally generated or stored sample sequence. It should be noted that the sets of samples 9, . . . , 16, 26 contain the same number of samples. However, the sets of samples 9, . . . , 16, 26 contain a larger number of samples than the sets of samples 1, . . . , 8, 25. It should also be noted that the sets of samples 9, . . . , 16, 26 are advantageously chosen to contain samples that are independent to the samples contained in the sets of samples 1, . . . , 8, 25. Upon selecting the sets of samples 9, . . . , 16, 26, the medium-resolution correlation continues with a comparison step. This comparison step involves concurrently comparing each of the sets of samples 9, . . . , 16 with the set of samples 26 to determine if a sufficient correlation exists between the same.

If a sufficient correlation exists between at least one of the sets of samples 9, . . . , 16 and the set of samples 26, then the fine-resolution correlation is performed. The fine-resolution correlation involves selecting the next N sets of samples from the received signal and a third set of samples from the internally generated or stored sample sequence. It should be noted that the sets of samples 17, . . . , 24, 27 contain the same number of samples. However, the sets of samples 17, . . . , 24, 27 contain a larger number of samples than the sets of samples 9, . . . , 16, 26. It should also be noted that the sets of samples 17, . . . , 24, 27 are advantageously chosen to contain samples that are independent to the samples contained in the sets of samples 9, . . . , 16, 26. Upon selecting the sets of samples 17, . . . , 24, 27, the fine-resolution correlation continues with a comparison step. This comparison step involves concurrently comparing each of the sets of samples 17, . . . , 24 with the set of samples 27 to determine if a sufficient correlation exists between the same. If a sufficient correlation exists between a set of samples 17, . . . , 24 and the set of samples 27, then a correlation peak value and correlation index value are computed and a next process begins.

A person skilled in the art can appreciate that the correlation process described above in relation to FIG. 4 does not illustrate an ability to verify correlation index values. In this regard, it should be appreciated that FIG. 4 illustrates the ability to transition from a low-resolution correlation to a medium-resolution correlation and from the medium-resolution correlation to a fine-resolution correlation. FIG. 4 does not illustrate the ability to transition from the medium-resolution correlation to the low-resolution correlation or from the fine-resolution correlation to the low-resolution correlation. However, a state-based correlation process can be employed for enabling a verification of correlation index values. A conceptual diagram of a state based correlation process is provided in FIG. 5.

Figure 5:
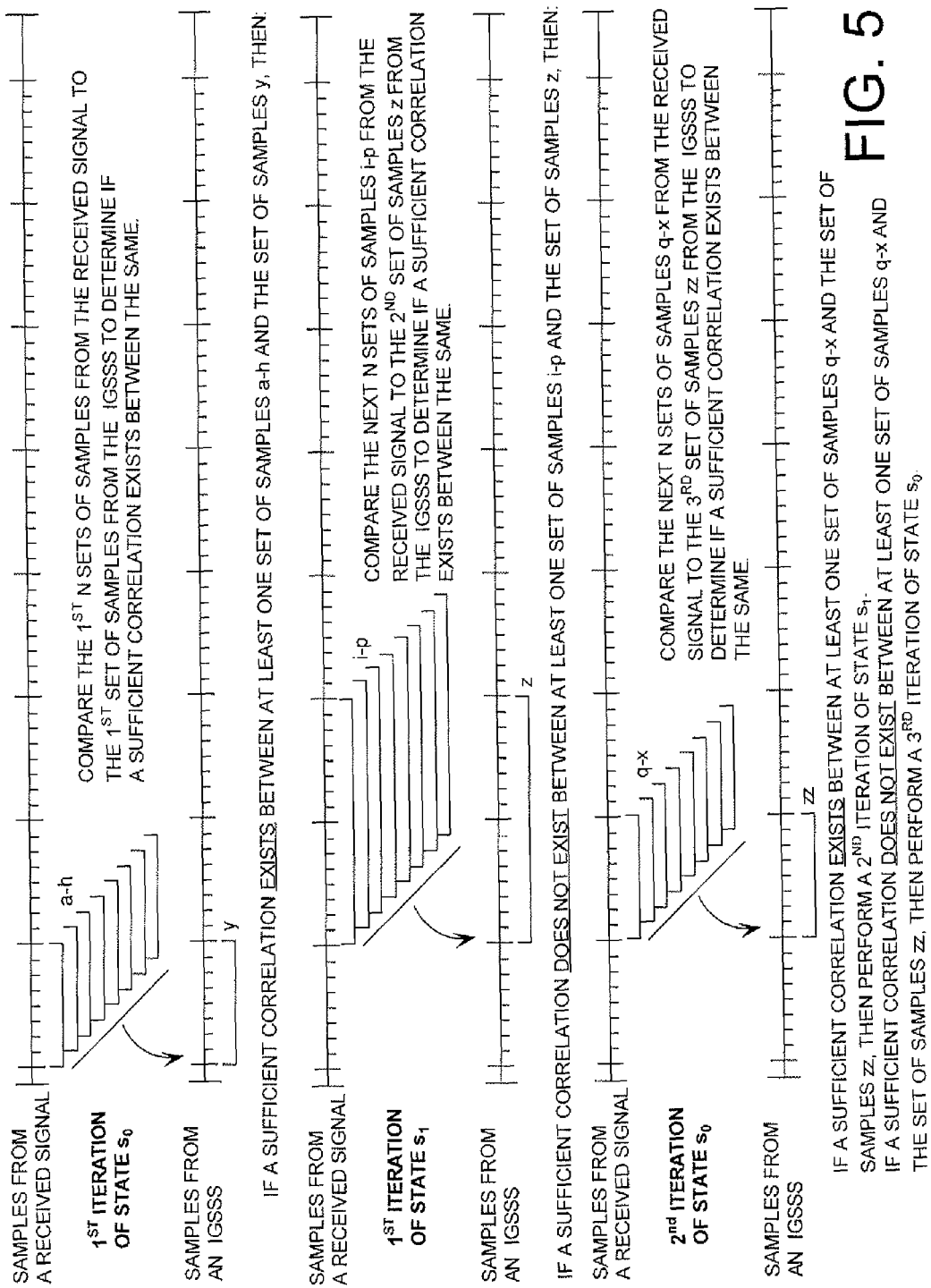
FIG. 5 is a conceptual diagram of a state based correlation process performed by the adaptive correlation device of FIG. 2.

Referring now to FIG. 5, the state-based correlation process begins with the performance of a first iteration $I_1$ of a low-resolution correlation state $s_o$. In this low-resolution correlation state $s_o$, N sets of samples are selected from the received signal. A first set of samples is also selected from the internally generated or stored sample sequence. It should be noted that the sets of samples a, . . . , h, y contain the same number of samples. The state based correlation process also involves concurrently comparing each of the sets of samples a, . . . , h from the received signal with the first set of samples y from the internally generated or stored sample sequence to determine if a sufficient correlation exists between the same.

If a sufficient correlation exists between at least one of the sets of samples a, . . . , h and the set of samples y, then the state is transitioned from the low-resolution correlation state $s_o$ to a medium-resolution correlation state $s_1$. During a first iteration $I_1$ of the medium-resolution correlation state $s_1$, the next N sets of samples are selected from the received signal. A second set of samples is also selected from the internally generated or stored sample sequence. It should be noted that the sets of samples i, . . . , p, z contain the same number of samples. However, the sets of samples i, . . . , p, z contain a larger number of samples than the sets of samples a, . . . , h, y. It should also be noted that the sets of samples i, . . . , p, z contain samples that are advantageously chosen to contain samples independent to the sets of samples a, . . . , h, y. Upon selecting the sets of samples i, . . . , p, z, each of the sets of samples i, . . . , p is concurrently compared with the set of samples z to determine if a sufficient correlation exists between the same.

If a sufficient correlation does not exist between at least one of the sets of samples i, . . . , p and the set of samples z, then the state is transitioned from the medium-resolution correlation state $s_1$ to the low-resolution correlation state $s_o$. During a second iteration $I_2$ of the low-resolution correlation state $s_o$, a next N sets of samples q-x are selected from the received signal. A third set of samples zz is also selected from the internally generated or stored sample sequence. It should be noted that the sets of samples q, . . . , x, zz contain the same number of samples. It should also be noted that the sets of samples q, . . . , x, zz contain samples having different relative time delays as compared to the samples contained in the sets of samples a, . . . , h, y. Upon selecting the sets of samples q, . . . , x, zz, the correlation process continues with a comparison step. This comparison step involves concurrently comparing each of the sets of samples q, . . . , x with the set of samples zz to determine if a correlation exists between the same. If a correlation exists between at least one of the sets of samples q, . . . , x and the set of samples zz, then (1) the state is transitioned from the low-resolution correlation state $s_o$ to the medium-resolution correlation state $s_1$ and (2) a second iteration $I_2$ of the medium-resolution correlation state $s_1$ is performed.

Figure 6:
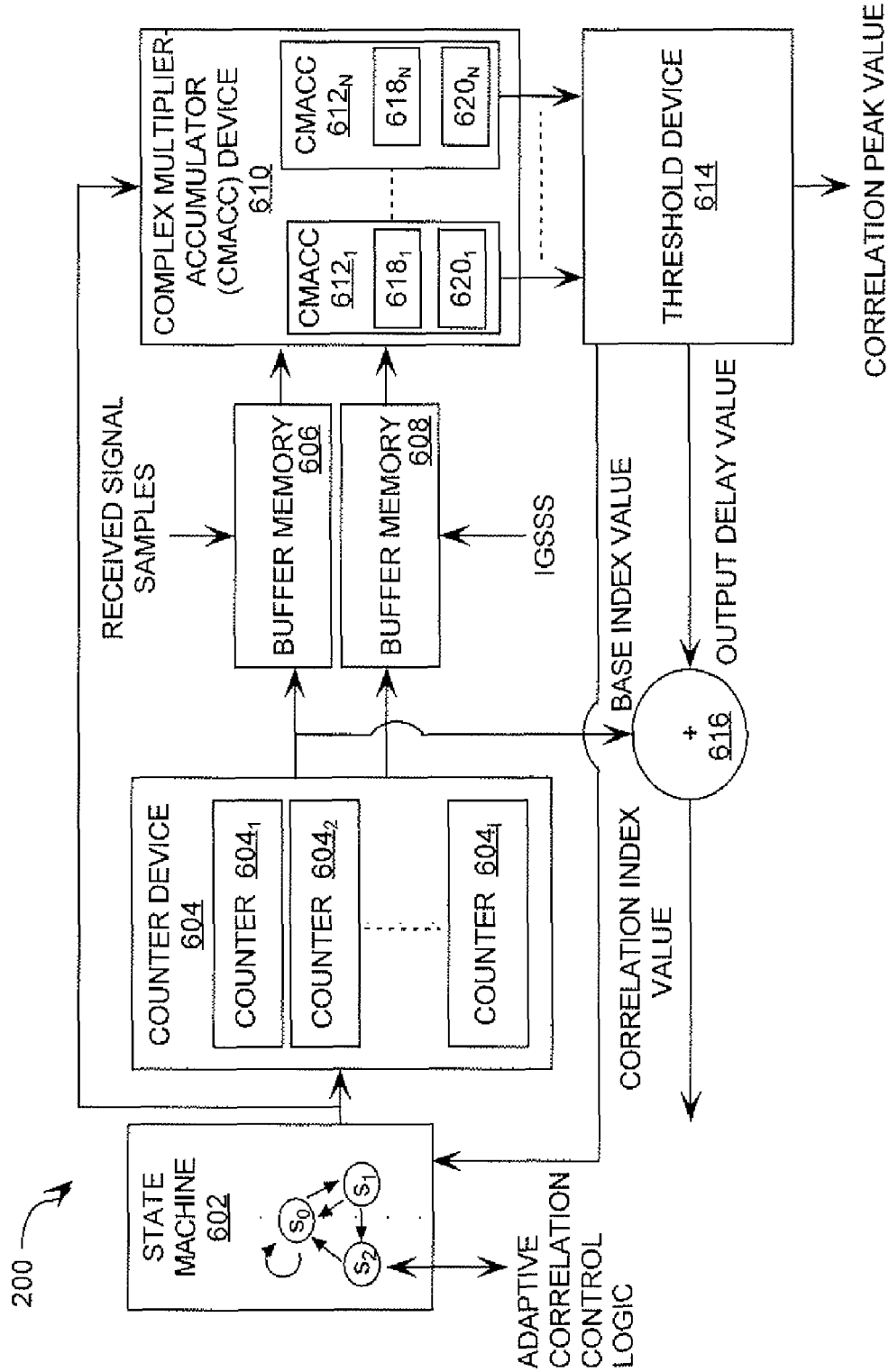
FIG. 6 is a more detailed block diagram of the adaptive correlation device implementing the correlation processes of FIG. 3 through FIG. 5.

Referring now to FIG. 6, there is provided an exemplary architecture of the adaptive correlation device 200 implementing the correlation processes described above in relation to FIGS. 3-5. As shown in FIG. 6, the adaptive correlation device 200 is comprised of a state machine 602, a counter device 604, buffer memories 606, 608, a complex multiplier-accumulator (CMACC) device 610, a threshold device 614, and an adder 616. Each of the listed components is well known to persons skilled in the art, and therefore will not be described in great detail herein. However, a brief discussion of the adaptive correlation device 200 is provided to assist a reader in understanding the present invention.

Referring again to FIG. 6, the state machine 602 is configured to transition between a plurality of states $s_0, s_1, s_2$. More particularly, the state machine 602 is configured to change the state $s_0, s_1, s_2$ of the adaptive correlation device 200 in response to a control signal communicated from the threshold device 614. It should be noted that such a state configuration allows for verification of correlation index values. This verification feature will become evident as the discussion of the adaptive correlation device 200 progresses. The state machine 602 will be described in greater detail below in relation to FIG. 7.

Figure 7:
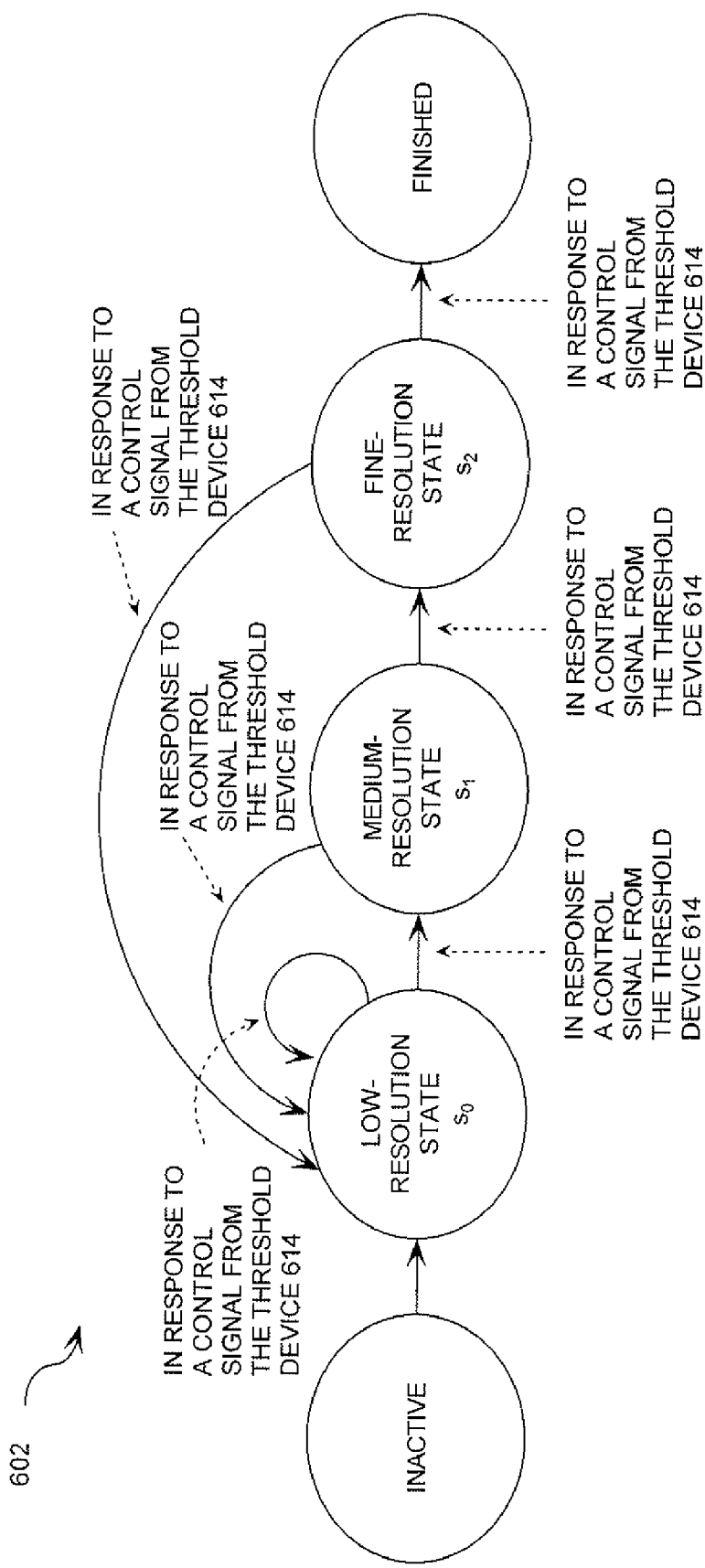
FIG. 7 is a diagram of an exemplary embodiment of a state machine that is useful for understanding the invention.

A state diagram of an exemplary embodiment of the state machine 602 is provided in FIG. 7. Referring now to FIG. 7, the state machine is configured to change the state $s_0, s_1, s_2$ of the adaptive correlation device 200 in response to a control signal communicated from the threshold device 614. The state machine 602 can change the state of the adaptive correlation device 200 from a low-resolution correlation state $s_0$ to a medium-resolution correlation state $s_1$ or from the medium-resolution correlation state $s_1$ to a fine-resolution correlation state $s_2$. Similarly, in response to the control signal, the state machine 602 can return the state of the adaptive correlation device 200 to the low-resolution correlation state $s_0$. Alternatively, the state machine 602 can change the state of the adaptive correlation device 200 from the medium-resolution correlation state $s_1$ to the low-resolution correlation state $s_0$ or from the fine-resolution correlation state $s_2$ to the low-resolution correlation state $s_0$. Still, the invention is not limited in this regard.

A person skilled in the art can also appreciate that the correlation process described above in relation to FIG. 7 can be implemented using any number of intermediate or verification correlation steps, and therefore any number of correlation states si, before achieving a correlation lock.

Referring again to FIG. 6, the counter device 604 is configured to specify memory addresses for reading sets of samples from the buffer memory 606 in a pre-defined order. The counter device 604 is also configured to specify memory addresses for reading samples from the buffer memory 608 in a pre-defined order. In this regard, it should be appreciated that the counter device 604 can be comprised of a plurality of counters $604_1, 604_2, \ldots, 604_i$. The counters $604_1, 604_2, \ldots, 604_i$ can be up counters configured to increment by one or more integer value in response to a clock signal. Each of the counters $604_1, 604_2, \ldots, 604_i$ is provided to specify memory addresses for reading sets of samples from the buffer memory 606 and samples from the buffer memory 608 in a pre-defined order during a particular state $s_0, s_1, \ldots, s_i$.

In this regard, it should be appreciated that the counter $604_1$ can be utilized when the adaptive correlation device 200 is in its initial state $s_0$. The counter $604_1$ can be configured to increment from a base index value to an integer value $n_1$. The phrase "base index value" as used herein refers to an integer value representing an initial address of the buffer memories and/or an initial sample of a received signal. The base index value can be selected in accordance with the number of times the adaptive correlation device 200 has been transitioned into its initial state $s_0$. For example, if the adaptive correlation device 200 is in a first iteration $I_1$ of the initial state $s_0$, then the base index value is equal to zero (0). If the adaptive correlation device 200 is in a second iteration $I_2$ of the initial state $s_0$, then the base index value is equal to a first non-zero integer value, such as eight (8). If the adaptive correlation device 200 is in a third iteration $I_3$ of the initial state $s_0$, then the base index value is equal to a second non-zero integer value, such as sixteen (16). Still, the invention is not limited in this regard.

Referring again to FIG. 6, the counter $604_2$ can be utilized when the adaptive correlation device 200 is in its second state $s_1$. The counter $604_2$ can be configured to increment from an integer value $(n_1+1)$ to an integer value $n_2$. Similarly, the counter $604_3$ can be utilized when the adaptive correlation device 200 is in its third state $s_2$. The counter $604_3$ can be configured to increment from an integer value $(n_2+1)$ to an integer value $n_3$, and so on.

The buffer memory 606 is configured to receive a plurality of received signal samples and store the same in storage locations with sequential addresses. The buffer memory 606 is also configured to communicate a set of samples to the CMACC device 610 every clock cycle and in an order defined by the counter device 604. The buffer memory 608 is configured to store samples of an internally generated or previously stored sample sequence in storage locations with sequential addresses. The buffer memory 608 is also configured to communicate a single sample to the CMACC device 610 every clock cycle and in an order defined by the counter device 604.

The CMACC device 610 is configured to receive a set of samples from the buffer memory 606 per clock cycle. The CMACC device 610 is also configured to receive a sample from the buffer memory 608 per clock cycle. The CMACC device 610 is further configured to perform a plurality of complex multiplies and accumulations. In this regard, it should be appreciated that the CMACC device 610 can be comprised of a plurality of complex multiply-accumulators (CMACCs) $612_1, \ldots, 612_N$. Each CMACC $612_1, \ldots, 612_N$ is configured to perform a complex multiply-accumulation process. In this regard, it should be understood that each CMACC $612_1, \ldots, 612_N$ can be comprised of a complex multiplier $618_1, \ldots, 618_N$ and a complex accumulator $620_1, \ldots, 620_N$. Each complex multiplier $618_1, \ldots, 618_N$ can be configured to compute a product during each clock cycle by multiplying a sample from the buffer memory 606 by a sample from a buffer memory 608. Each complex multiplier $618_1, \ldots, 618_N$ can also be configured to communicate computed products to a respective complex accumulator $620_1, \ldots, 620_N$ for use in an accumulation process. The accumulation process involves adding the computed products together to obtain an accumulation value. Each CMACC $612_1, \ldots, 612_N$ can also be configured to compute the magnitude of the accumulated value via multiplication of the accumulated value with its complex conjugate. Each complex accumulator $620_1, \ldots, 620_N$ can be configured to communicate accumulation values to the threshold device 614.

The threshold device 614 is configured to receive a value from each of the CMACCs $612_1, \ldots, 612_N$. The threshold device 614 is also configured to compare each received value to a specific threshold value $thr_o, \ldots, thr_i$. Each threshold value $thr_o, \ldots, thr_i$ is selected in accordance with the state $s_0, s_1, \ldots, s_i$ of the adaptive correlation device 200. For example, if the adaptive correlation device 200 is in its initial state $s_0$, then the threshold value used in the comparison process is $thr_o$. Similarly, if the adaptive correlation device 200 is in its second state $s_1$, then the threshold value used in the comparison process is $thr_1$, and so on. Still, the invention is not limited in this regard.

The threshold device 614 is also configured to communicate a control signal to the state machine 602 based on the outcome of the comparison process. For example, if all accumulation values are less than a given threshold value, then the threshold device 614 communicates a control signal to the state machine 602 indicating that the state machine should revert to the state $s_0$ and proceed to the next base correlation index. If at least one of the accumulation values is greater than or equal to a given threshold value, then the threshold device 614 communicates a control signal to the state machine 602 indicating that it should proceed to the next subsequent state for a more precise correlation calculation. The threshold device 614 is further configured to perform an arithmetic process to estimate the relative delay between the two (2) sequences within the CMACC correlation window. The output value provides an indication of which CMACC(s) $612_1, \ldots, 612_N$ produced an accumulation value greater than or equal to the threshold value. The output delay value can be an integer number or a decimal number. For example, if CMACCs $612_1, 612_2$ both produce accumulation values greater than or equal to the threshold value, then the calculated delay will most likely equal a decimal, non-integer delay value. The decimal value is determined by some pre-defined arithmetic process, such as an arithmetic process based on center-of-mass or $L_p$ norm. Still, the invention is not limited in this regard.

Upon determining an output delay value, the threshold device 614 communicates the same to the adder 616. The adder 616 is configured to receive the output value from the threshold device and a base index value from the counter device 604. Upon receipt of these values, the adder 616 adds the same together to obtain a correlation index value. The adder 616 is also configured to communicate the correlation index value to a sampling device (not shown).

Figure 8:
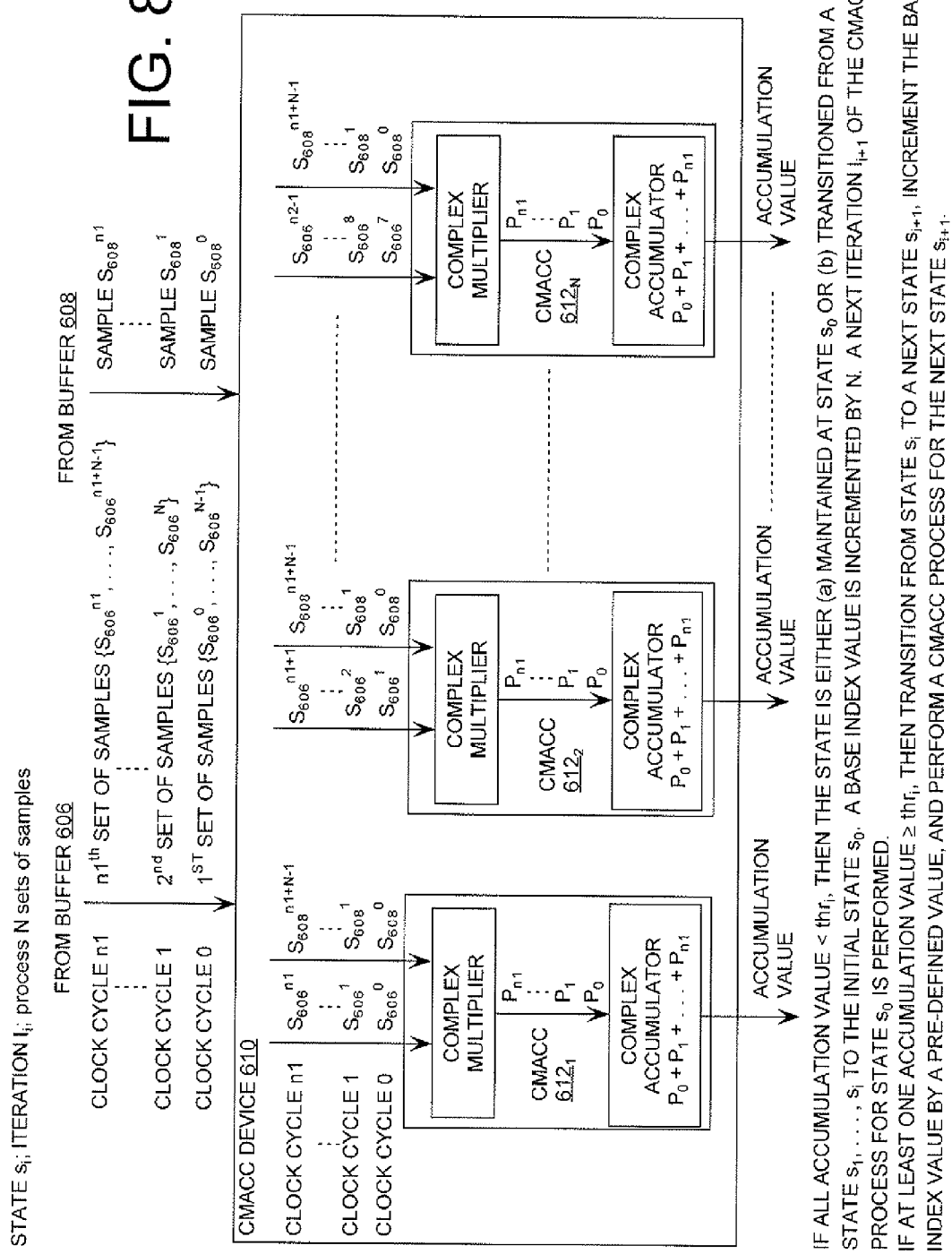
FIG. 8 is an illustration of a correlation process performed by the adaptive correlation device of FIG. 6 during iteration $I_i$ of state $s_i$.

The operation of the adaptive correlation device 200 will now be described in relation to FIG. 8. It should be noted that FIG. 8 provides an illustration of a process performed by the adaptive correlation device 200 during an iteration $I_i$ of a state $s_i$. It should also be noted that the adaptive correlation device 200 performs sample processing on n1 sets of samples from a received signal per iteration $I_1, \ldots, I_i$ of a state $s_0, s_1, \ldots, s_i$. It should further be noted that each set of samples from a received signal is comprised of N samples. The variable "N" is an integer value representing the number of CMACCs $612_1, \ldots, 612_N$ comprising the CMACC device 610.

As shown in FIG. 8, sets of samples from the buffer memory 606 are communicated to the CMACC device 610 every clock cycle. For example, the CMACC device 610 receives a first set of samples $\{S_{606}^0, \ldots, S_{606}^{N-1}\}$ from the buffer memory 606 during a first clock cycle. The CMACC device 610 receives a second set of samples $\{S_{606}^1, \ldots, S_{606}^N\}$ from the buffer memory 606 during a second clock cycle. The CMACC device 610 receives a third set of samples $\{S_{606}^2, \ldots, S_{606}^{N+1}\}$ from the buffer memory 606 during a third clock cycle, and so on. Still, the invention is not limited in this regard.

Upon receipt of a set of samples, the CMACC device 610 forwards a sample from the received set of samples to each CMACC $612_1, \ldots, 612_N$. For example, a sample $S_{606}^0$ from the first set of samples is forwarded to the CMACC $612_1$. A sample $S_{606}^1$ from the first set of samples is forwarded to the CMACC $612_2$. A sample $S_{606}^2$ from the first set of samples is forwarded to the CMACC $612_3$, and so on. Still, the invention is not limited in this regard.

The CMACC device 610 also receives a sample from the buffer memory 608 every clock cycle. For example, the CMACC device 610 receives a first sample $S_{608}^0$ from the buffer memory 608 during a first clock cycle. The CMACC device 610 receives a second sample $S_{608}^1$ from the buffer memory 608 during a second clock cycle, and so on. Upon receipt of a sample $S_{608}^0, \ldots, S_{608}^{N-1}$ from the buffer memory 608, the CMACC device 610 forwards the same to each CMACC $612_1, \ldots, 612_N$.

Each CMACC $612_1, \ldots, 612_N$ performs actions to complex multiply the received samples to obtain a product $P_0, \ldots, P_{n1}$. For example, each CMACC $612_1, \ldots, 612_N$ complex multiplies a respective sample $S_{606}^0, \ldots, S_{606}^{N-1}$ by a sample $S_{608}^0$ to obtain a product $P_0$. Thereafter, each CMACC $612_1, \ldots, 612_N$ complex multiplies a respective sample $S_{606}^1, \ldots, S_{606}^N$ by a sample $S_{608}^1$ to obtain a product $P_1$, and so on. Still, the invention is not limited in this regard.

Subsequent to computing a product $P_0, \ldots, P_{n1}$, each CMACC $612_1, \ldots, 612_N$ performs actions to accumulate the same. More particularly, each complex accumulator $620_1, \ldots, 620_N$ adds the computed products $P_0, \ldots, P_{n1}$ together to obtain an accumulation value. Each complex accumulator $620_1, \ldots, 620_N$ forwards a respective accumulation value to the threshold device 614. The threshold device 614 determines whether at least one of the accumulation values is equal to or greater than a threshold value $thr_i$.

If all of the accumulation values are less than the threshold value $thr_i$, then the threshold device 614 communicates a low control signal to the state machine 602. As a result, the state of the adaptive correlation device 200 is either (a) maintained in its initial state $s_0$ or (b) transitioned from a state $s_1, \ldots, s_i$ to the initial state $s_0$. The base index value is also incremented by a pre-defined value N. A next iteration $I_{i+1}$ of the CMACC process for the initial state $s_0$ is then performed.

If at least one of the accumulation values is equal to or greater than the threshold value $thr_i$, then the threshold device 614 communicates a high control signal to the state machine 602. As a result, the state of the adaptive correlation device 200 is transitioned from a state $s_i$ to a next state $s_{i+1}$. The base index value is also incremented by a pre-defined value. A CMACC process for the next state $s_{i+1}$ is then performed or the delay is computed if the state machine is in the highest state.

In light of the forgoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for correlating samples of a received signal and samples of an internally generated or stored sample sequence, comprising: performing, by at least one electronic circuit, a first iteration of a low-resolution correlation, said low-resolution correlation including the steps of: selecting a first N sets of received signal samples from a received signal; selecting a first set of reference samples from an internally generated or stored sample sequence; concurrently comparing each of said first N sets of received signal samples with said first set of reference samples to determine if a sufficient correlation exists between the same, wherein a sufficient correlation exists when a correlation peak value associated with a respective one of said first N sets of received signal samples exceeds a pre-defined threshold value; performing a second iteration of said low-resolution correlation if it is determined that a sufficient correlation does not exist between said first N sets of received signal samples and said first set of reference samples; and performing, by at least one electronic circuit, a first iteration of a higher-resolution correlation if it is determined that a sufficient correlation exists between at least one of said first N sets of received signal samples and said first set of reference samples, and said higher-resolution correlation comprising obtaining a plurality of correlation values by comparing each of a second N sets of received signal samples with a second set of reference samples; wherein said first N sets of received signal samples and said first set of reference samples comprise the same number of samples, and each of said second N sets of received signal samples comprises a larger number of samples than each of said first N sets of received signal samples.

2. The method according to claim 1, wherein said higher-resolution correlation comprises the steps of (a) selecting said second N sets of received signal samples from a received signal and (b) selecting said second set of reference samples from said internally generated or stored sample sequence, wherein said second N sets of received signal samples and said second set of reference samples comprise the same number of samples.

3. The method according to claim 1, wherein said second N sets of received signal samples comprise samples that are delayed in time as compared to samples contained in said first N sets of received signal samples.

4. The method according to claim 1, wherein said second set of reference samples comprises samples that are delayed in time as compared to samples contained in said first set of reference samples.

5. The method according to claim 2, wherein said higher-resolution correlation further comprises the step of concurrently comparing each of said second N sets of received signal samples with said second set of reference samples to determine if a sufficient correlation exists between the same.

6. The method according to claim 5, further comprising computing, by said electronic circuit, a correlation index value if it is determined that a sufficient correlation exists between at least one of said second N sets of received signal samples and said second set of reference samples.

7. The method according to claim 1, wherein said higher-resolution correlation operates on independent sets of samples with the same relative delays as said samples of said first set of reference samples with a correlation peak to compute a correlation verification or an independent correlation measure.

8. The method according to claim 1, wherein said second iteration of said low-resolution correlation comprises the step of selecting a second N sets of received signal samples from said received signal and a second set of reference samples from said internally generated or stored sample sequence, wherein said second N sets of received signal samples and said second set of reference samples comprise the same number of samples.

9. The method according to claim 8, wherein said second N sets of received signal samples comprise the same number of samples as said first N sets of received signal samples.

10. The method according to claim 8, wherein said second N sets of received signal samples comprise samples that are delayed in time as compared to samples contained in said first N sets of received signal samples.

11. A method for correlating samples of a received signal and samples of an internally generated or stored sample sequence, comprising: performing, by at least one electronic circuit, a first iteration of a first-resolution correlation state, said first-resolution correlation state comprising the steps of: selecting a first N sets of received signal samples from a received signal; selecting a first set of reference samples from an internally generated or stored sample sequence; concurrently comparing each of said first N sets of received signal samples with said first set of reference samples to determine if a sufficient correlation exists between the same, wherein a sufficient correlation exists when a correlation peak value associated with a respective one of said first N sets of received signal samples exceeds a pre-defined threshold value; performing, by said electronic circuit, a second iteration of said first-resolution correlation state if it is determined that a sufficient correlation does not exist between at least one of said first N sets of received signal samples and said first set of reference samples; and performing, by said electronic circuit, a first iteration of a second-resolution correlation state if it is determined that a sufficient correlation exists between at least one of said first N sets of received signal samples and said first set of reference samples, said second-resolution correlation state comprising obtaining a plurality of correlation values by comparing each of a second N sets of received signal samples with a second set of reference samples, wherein each of said second N sets of received signal samples comprises a larger number of samples than each of said first N sets of received signal samples.

12. The method according to claim 11, wherein said first N sets of received signal samples and said first set of reference samples comprise the same number of samples.

13. The method according to claim 11, wherein said second-resolution correlation state comprises the steps of (a) selecting said second N sets of received signal samples from a received signal and (b) selecting said second set of reference samples from said internally generated or stored sample sequence, wherein said second N sets of received signal samples and said second set of reference samples comprise the same number of samples.

14. The method according to claim 11, wherein said second N sets of received signal samples comprise samples that are delayed in time as compared to samples contained in said first N sets of received signal samples.

15. The method according to claim 11, wherein said second set of reference samples comprises samples that are delayed in time as compared to samples contained in said first set of reference samples.

16. The method according to claim 13, wherein said second-resolution correlation state further comprises the step of concurrently comparing each of said second N sets of received signal samples with said second set of reference samples to determine if a sufficient correlation exists between the same.

17. The method according to claim 16, further comprising computing, by said electronic circuit, a correlation index value if it is determined that a sufficient correlation exists between at least one of said second N sets of received signal samples and said second set of reference samples.

* * * * *